Aug. 30, 1927.
M. B. STAZAK
1,640,431
RELAY
Filed Nov. 15, 1922
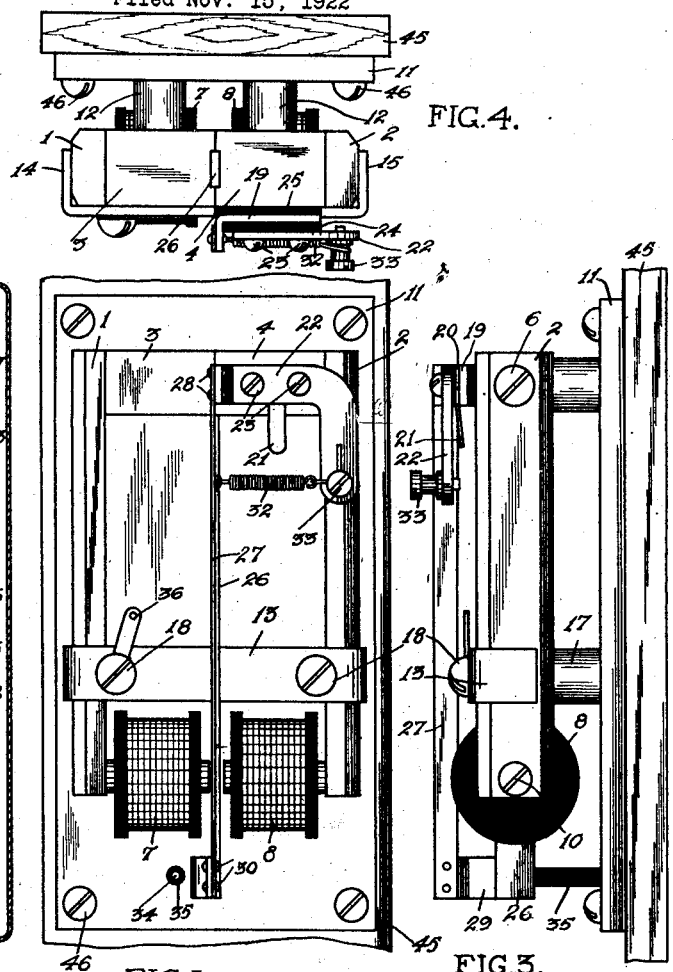
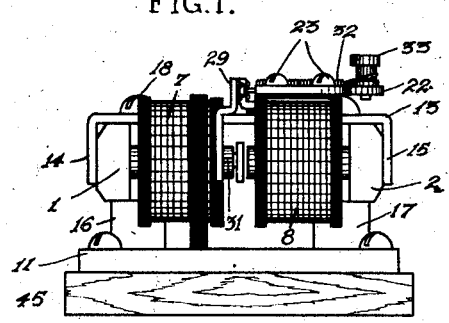
INVENTOR
MICHAEL B. STAZAK.
BY Curtis B Camp
ATTORNEY Patented Aug. 30, 1927.

1,640,431

UNITED STATES PATENT OFFICE.

MICHAEL B. STAZAK, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

RELAY.

Application filed November 15, 1922. Serial No. 601,014.

My invention relates to relays, and more particularly to that class of relays which is used in conjunction with composite ringing telephone circuits and telegraph circuits, and which are adapted to effectively respond to high frequency currents to open a circuit, but which permit the circuit to remain closed at low frequency.

Prior to my invention, relays of the above class included a single permanent magnet having a pair of electromagnet coils secured to it so that the cores of said electromagnet coils are of unlike poles and adapted to control the operation of an armature which controls a circuit controlling member secured to the relay. When current impulses of high frequency pass through the electromagnet coils the magnetic field is disturbed to effect the operation of the armature which will cause the circuit controlling member to operate, and due to the operation of the armature and circuit controlling member, the circuit controlled by the relay will be opened. This type of relay is objectionable in that it is difficult to bring about the proper disturbance of the magnetic field to insure a positive operation of the relay to open a circuit, as is required in telephone and telegraph circuits.

In order to overcome the above objectionable feature and to provide a relay most efficient in its operation, I have provided a relay which is composed of two permanent magnets, to the ends of which having the same polarity is secured a pair of electromagnet coils so that the cores of said coils are of like magnetic poles and adapted to control the operation of an armature secured between said cores. When current impulses of high frequency pass through the said coils the magnetic field is unbalanced, thus bringing about a rapid vibration of the said armature, which in turn brings about the vibration of a circuit-controlling member operatively associated with said armature, to open a circuit controlled by said relay. By having the relay of my invention provided with two permanent magnets and the electromagnet coils secured to the ends of said magnets having the same polarity, which will cause the cores of said coils to be of like poles, I am able to disturb the magnetic field by a high frequency current to effect a more efficient and positive operation of the armature and circuit-controlling member.

The above features, as well as others, will be explained more in detail by reference to the accompanying drawing, in which like reference characters in the several views denote like parts, and in which Fig. 1 is a top plan view of the relay of my invention, with the cover or casing removed;

Fig. 2 is a left side view of Fig. 1;

Fig. 3 is a right side view of Fig. 1;

Fig. 4 is a top end view of Fig. 1; and

Fig. 5 is a bottom end view of Fig. 1.

Referring now more in detail to the relay of my invention as illustrated, said relay comprises a pair of permanent magnets 1 and 2 secured at their one end of the same polarity to a pair of members 3 and 4, respectively, by means of suitable screws 5 and 6, which extend through suitable orifices in the magnets 1 and 2, respectively, and have screw-threaded engagement with suitably tapped orifices in said members 3 and 4. A pair of electromagnet coils 7 and 8 are suitably secured to and between the other ends of the permanent magnets 1 and 2 by means of screws 9 and 10, which extend through openings in the magnets 1 and 2 and have screw-threaded engagement with suitably tapped orifices in the cores of the coils 7 and 8, respectively, said other ends of the magnets 1 and 2 being of the same polarity. The members 3 and 4 are secured to a mounting member 11 by means of screws (said screws not shown on drawing) which extend through said member 11 and through cylindrical members 12, and which screws then have screw-threaded engagement with suitably tapped orifices in said members 3 and 4, said cylindrical members separating the members 3 and 4 from the mounting member 11 and members 3 and 4 engaging each other in such manner that the cores of the electromagnet coils 7 and 8 are in alignment with each other so that a space will be provided between the free ends of the cores of said coils 7 and 8. A U-shaped member 13 for maintaining the magnets 1 and 2 in their mounted position is provided which has its legs 14 and 15 engaging the outer sides of the permanent magnets 1 and 2, respectively, said permanent magnets 1 and 2 resting on cylindrical members 16 and 17, respectively, and secured thereon by means of screws 18 which engage the inner sides of the permanent magnets and pass through suitable openings in the U-shaped member 13, and also through the cylindrical members 16 and 17, and then have screw-threaded engagement with suitably tapped orifices in the mounting member 11. An L-shaped member 19 and a member 20 having a terminal extension 21 for receiving a conductor are provided and are in contactual engagement with each other. Another member 22 is provided, said members 19, 20 and 22 being secured to the member 4 by means of screws 23, which pass through openings in member 22, insulating member 24, which insulates member 22 from members 19 and 20, openings in said members 19 and 20 and insulating member 25 which insulates member 19 from member 4, said screws 23 having screw-threaded engagement with suitably tapped orifices in said member 4, said screws 23 also being suitably insulated from member 19. Between the members 3 and 4 and in depressions provided in said members 3 and 4 is secured a reed armature 26, the free end of said armature 26 extends forwardly and rests between the free ends of the cores of the electromagnet coils 7 and 8, and is adapted to be acted upon by the said electromagnets 7 and 8.

A resilient spring member 27 is provided and is secured to the L-shaped member 19 by means of rivets 28. An angular weighted member 29 is secured to the free end of said spring member 27 by means of rivets 30, said member 29 extending downward and opposite the armature 26, said member 29 having a contact member 31 suitably secured to it for engaging the side of said armature 26. A spring 32 having its one end fastened to the member 27 and its other end secured to an adjustable screw 33 suitably secured in the member 22, said screw 33 adapted to regulate the tension of said spring 32, is provided for normally maintaining the contact 31 of member 29 in contactual engagement with the armature 26. A stop pin 34 having an insulation sleeve 35, is provided and secured in any suitable manner to the member 11, so that the said stop pin 34 will be opposite the member 29 to limit the vibratory movement of the said member 27. A terminal member 36 is provided and secured to the member 13 by the screw 18, said terminal member being adapted to have a conductor connected to it. The relay as a whole is mounted on a suitable mounting member 45, such as wood or the like, by means of screws 46, which extend through the member 11 and into the said member 45. A cover or casing 47 is provided for enclosing the relay and is secured to the mounting member 45 by means of suitable screws 48.

Having described the construction of my relay, I will now describe its operation. When current of a high frequency passes through the electromagnet coils 7 and 8, the armature 26 is acted upon, causing said armature 26 to vibrate in synchronism with the high frequency circuit, which in turn will cause the spring member 27 to vibrate. The rate of vibration of the spring member 27 is much lower than that of the armature 26, partly because it is lighter than the armature, and partly because its weight is unequally distributed due to the weighted member 29 secured to the end of said spring member 27. The armature 26 and the spring member 27 possesses diverse motions and, therefore, when the armature 26 and the spring member 27 are vibrated, the armature 26 and spring member 27 pull away from each other. The spring member 27, due to its construction and the weighted member 29, cannot follow promptly the vibrations of the reed armature 26, so that the contact between the said armature 26 and weighted member 29 is broken at this time and will remain disengaged periodically so long as the armature 26 vibrates, since the armature and member 27 do not vibrate in synchronism with each other. The spring member 27 and weighted member 29 and armature 26 are so balanced and adjusted that they do not effectively respond to current impulses of low frequency whereby the contact 31 of member 29 remains in engagement with the armature 26, but will respond to current impulses of high frequency.

When low frequency current passes through the coils 7 and 8, the armature will vibrate but its vibration will be slow enough to permit the member 29 secured to member 27 to follow the vibratory movement of the armature and remain in contactual engagement with the armature 26, thereby permitting the circuit through the spring member 27 and armature 26 to remain closed.

While I have described and illustrated a particular embodiment of my invention, I do not wish to be limited to the exact structure as shown and described, as modifications and changes may readily suggest themselves to those skilled in the art, and I, therefore, aim to cover all such modifications and changes as come within the spirit and scope of the appended claims.

Having described my invention what I claim as new and desire to secure by Letters Patent is:

1. In a relay of the class described including a mounting plate, a pair of permanent magnets mounted upon said mounting plate and parallel to each other, the ends of said permanent magnets of like polarity being disposed opposite each other, a pair of electromagnet coils secured to and between one pair of ends of said permanent magnets, an armature operatively associated with and between the ends of the cores of said electromagnets, a spring contact member normally in engagement with said armature for closing a circuit between said armature and said contact member, said armature adapted to vibrate when current impulses of high frequency flows through said electromagnets, whereupon said spring member vibrates to open the circuit periodically so long as said armature is vibrating, and a yoke member for maintaining said magnets on said mounting plate and also for retaining said coils in operative relation with said armature.

2. In a relay of the character described, including a mounting plate, a pair of permanent magnets, means for mounting said magnets upon said mounting plate, said permanent magnets being mounted parallel to each other so that their ends of like polarity are opposite each other, a pair of electromagnet coils secured to and between a pair of ends of said magnets, an armature operatively associated with said electromagnets, a yoke member for maintaining said magnets on said mounting plate and said coils in operative relation with said armature, a contact member, a spring for normally retaining said contact member in contactual engagement with said armature to close a circuit between said armature and a contact member, said armature adapted to be acted upon by said electromagnets to cause the same to vibrate when high frequency current passes through said coils to bring about the vibration of said contact member, said contact member and armature being constructed so as not to vibrate in synchronism, thereby causing said contact member to disengage said armature to open the normally closed circuit, said armature and contact member remaining in contactual engagement with each other when low frequency current is passing through said coils.

3. In a relay of the class described including a mounting plate, a pair of permanent magnets having their one end of like polarity secured to a pair of mounting members secured to said mounting plate, a pair of electromagnet coils secured to and between the free ends of said permanent magnets, the cores of said coils being of the same polarity, an armature secured between said pair of mounting members and extending in operative relation between the cores of said coils, a yoke member for maintaining said magnets on said mounting plate and said coils in operative relation with said armature, a contact member normally maintained in contactual engagement with said armature by a spring member to close a circuit controlled by said relay, said armature adapted to vibrate when high frequency current passes through said coils to effect the vibration of said contact member but not in synchronism with said armature whereby said contact member disengages said armature to open the said normally closed circuit controlled by said relay, and means for adjusting the tension of the spring member.

4. In a relay of the class described including a mounting plate, a pair of permanent magnets mounted thereon parallel to each other and having their ends of the same polarity opposite each other, a pair of electromagnet coils secured to and between one pair of ends of said magnets, an armature operatively associated with the cores of said coils, a yoke member for maintaining said magnets on said mounting plate and said coils in operative relation with said armature, a contact member, a spring for normally maintaining said contact member in engagement with said armature to close a circuit, means for adjusting the tension of said spring, said armature adapted to be acted upon by the cores of said coils when current of high frequency passes through said coils to unbalance the magnetic field between the cores of said coils to cause said armature to vibrate in synchronism with the impulses of the high frequency current, whereby said contact member will vibrate but not in synchronism with said armature to open the said normally closed circuit, and a stop member for limiting the length of the vibratory movement of said contact member.

5. In a relay of the class described including a mounting plate, a pair of permanent magnets mounted thereon parallel to each other and having their ends of the same polarity opposite each other, a pair of electromagnet coils secured to and between one pair of ends of said magnets, an armature operatively associated with the cores of said coils, a yoke member for maintaining said magnets on said mounting plate and said coils in operative relation with said armature, a contact member, a spring for normally maintaining said contact member in engagement with said armature to close a circuit between said armature and said contact member, means for adjusting the tension of said spring, said armature adapted to be acted upon by the cores of said coils when current of high frequency passes through said coils to unbalance the magnetic field between the cores of said coils to cause said armature to vibrate in synchronism with the impulses of the high frequency current, whereby said contact member will vibrate but not in synchronism with said armature to open the said normally closed circuit, and a supporting member adapted for having said relay as a unit secured thereto.

6. In a relay of the class described including a mounting plate, a pair of permanent magnets mounted thereon parallel to each other and having their ends of the same polarity opposite each other, a pair of electromagnet coils secured to and between one pair of ends of said magnets, an armature operatively associated with the cores of said coils, a yoke member for maintaining said magnets on said mounting plate and said coils in operative relation with said armature, a contact member, a spring for normally maintaining said contact member in engagement with said armature to close a circuit between said armature and said contact member, means for adjusting the tension of said spring, said armature adapted to be acted upon by the cores of said coils when current of high frequency passes through said coils to unbalance the magnetic field between the cores of said coils to cause said armature to vibrate in synchronism with the impulses of the high frequency current whereby said contact member will vibrate but not in synchronism with said armature to open the said normally closed circuit, and terminal members for said relay for receiving conductors to provide a circuit to be controlled by said relay.

7. In a relay of the class described including a mounting plate, a pair of permanent magnets mounted thereon parallel to each other and having their ends of the same polarity opposite each other, a pair of electromagnet coils secured to and between one pair of ends of said magnets, an armature operatively associated with the cores of said coils, a contact member, a spring for normally maintaining said contact member in engagement with said armature to close a circuit between said armature and said contact member, means for adjusting the tension of said spring, said armature adapted to be acted upon by the cores of said coils when current of high frequency passes through said coils to unbalance the magnetic field between the cores of said coils to cause said armature to vibrate in synchronism with the impulses of the high frequency current, whereby said contact member will vibrate but not in synchronism with said armature to open the said normally closed circuit, and a yoke member for maintaining said magnets on said mounting plate and also for retaining said coils in operative relation with said armature.

8. A device of the class described including a mounting member, a pair of permanent magnets secured to said mounting member and arranged so that they are parallel to each other and have their poles of like polarity opposite each other, a pair of electromagnets associated with one pair of ends of said pair of permanent magnets, an armature operatively associated with said electromagnets, a yoke member for maintaining said magnets on said mounting plate and said coils in operative relation with said armature, and a circuit controlling member operatively associated with said armature and adapted to be acted upon by said armature when said armature begins to be operated by said electromagnets, said armature and said circuit controlling member arranged so as to not vibrate in synchronism.

9. A device of the class described including a mounting member, a pair of electromagnets mounted on said mounting member, a pair of electromagnets operatively associated with said pair of permanent magnets, an armature operatively associated with said pair of electromagnets, a yoke member for maintaining said magnets on said mounting plate and said coils in operative relation with said armature, a circuit controlling member associated with said armature and adapted to vibrate when said armature vibrates but not in synchronism with said armature.

10. A device of the class described including a mounting member, a pair of permanent magnets mounted on said mounting member, a pair of electromagnet coils secured to a pair of the ends of said pair of permanent magnets, an armature operatively associated with said pair of electromagnet coils, a yoke member for maintaining said magnets on said mounting plate and said coils in operative relation with said armature, and a contact member associated with said armature and adapted to vibrate when said armature vibrates but not in synchronism therewith.

Signed by me at Chicago, in the county of Cook and State of Illinois, this 13th day of November, 1922.

MICHAEL B. STAZAK.